(12) United States Patent
Zhao et al.

(10) Patent No.: US 11,460,950 B2
(45) Date of Patent: Oct. 4, 2022

(54) DISPLAY PANEL AND DISPLAY DEVICE

(71) Applicants: Ordos Yuansheng Optoelectronics Co., Ltd., Inner Mongolia (CN); BOE Technology Group Co., Ltd., Beijing (CN)

(72) Inventors: Jing Zhao, Beijing (CN); Jigang Sun, Beijing (CN); Shuang Zhao, Beijing (CN)

(73) Assignees: Ordos Yuansheng Optoelectronics Co., Ltd., Inner Mongolia (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 16/767,128

(22) PCT Filed: Dec. 25, 2019

(86) PCT No.: PCT/CN2019/128363
§ 371 (c)(1),
(2) Date: May 27, 2020

(87) PCT Pub. No.: WO2020/140813
PCT Pub. Date: Jul. 9, 2020

(65) Prior Publication Data
US 2021/0223936 A1    Jul. 22, 2021

(30) Foreign Application Priority Data
Jan. 4, 2019    (CN) .......................... 201910009236.4

(51) Int. Cl.
*G06F 3/041*    (2006.01)
*G02F 1/1333*    (2006.01)

(52) U.S. Cl.
CPC ........ *G06F 3/04166* (2019.05); *G06F 3/0412* (2013.01); *G06F 3/04164* (2019.05); *G02F 1/13338* (2013.01)

(58) Field of Classification Search
None
See application file for complete search history.

(56) References Cited

U.S. PATENT DOCUMENTS

| 2008/0062089 A1 | 3/2008 | Kim et al. |
| 2018/0011362 A1 | 1/2018 | Kobayashi et al. |
| (Continued) | | |

FOREIGN PATENT DOCUMENTS

| CN | 101145318 A | 3/2008 |
| CN | 105182633 A | 12/2015 |
| (Continued) | | |

OTHER PUBLICATIONS

Office Action dated Mar. 26, 2020 for Chinese Patent Application No. 201910009236.4 and English Translation.
(Continued)

*Primary Examiner* — Krishna P Neupane
(74) *Attorney, Agent, or Firm* — Ling Wu; Stephen Yang; Ling and Yang Intellectual Property

(57) ABSTRACT

A display panel includes a touch display region and a border region, wherein multiple touch drive lines and multiple multi-path selection units are disposed within the touch display region, each of the multi-path selection units is electrically connected with at least part of the multiple touch drive lines, the border region includes a wiring region, and input signal lines of the multi-path selection units are arranged within the wiring region.

11 Claims, 4 Drawing Sheets

(56) References Cited

U.S. PATENT DOCUMENTS

| | | | |
|---|---|---|---|
| 2018/0129090 A1 | 5/2018 | Tsai et al. | |
| 2019/0041676 A1* | 2/2019 | Xing | G09G 3/3648 |
| 2019/0332202 A1 | 10/2019 | Huang et al. | |
| 2020/0026384 A1* | 1/2020 | Rhe | G09G 3/2092 |
| 2020/0110483 A1* | 4/2020 | Lee | G06F 3/044 |

FOREIGN PATENT DOCUMENTS

| | | | | |
|---|---|---|---|---|
| CN | 105652498 A | | 6/2016 | |
| CN | 206193729 U | * | 5/2017 | G06F 3/041 |
| CN | 206193729 U | | 5/2017 | |
| CN | 107342062 A | | 11/2017 | |
| CN | 108595051 A | | 9/2018 | |
| CN | 109669292 A | | 4/2019 | |
| KR | 20190000201 A | | 1/2019 | |

OTHER PUBLICATIONS

Office Action dated Aug. 4, 2020 for Chinese Patent Application No. 201910009236.4 and English Translation.

International Search Report for PCT/CN2019/128363 dated Mar. 19, 2020.

Office Action dated Oct. 29, 2020 for Chinese Patent Application No. 201910009236.4 and English Translation.

* cited by examiner

DISPLAY PANEL AND DISPLAY DEVICE

CROSS-REFERENCE TO RELATED APPLICATIONS

The present application is a U.S. National Phase Entry of International Application No. PCT/CN2019/128363 having an international filing date of Dec. 25, 2019, which claims the priority to the Chinese patent application No. 201910009236.4 entitled "Display Panel and Display Device", filed to the CNIPA on Jan. 4, 2019. The above-identified applications are hereby incorporated by reference in their entirety.

TECHNICAL FIELD

The present disclosure relates to, but is not limited to, the technical field of display, in particular to a display panel and a display device.

BACKGROUND

At present, users' requirements for full display of liquid crystal display products are increasingly higher. The full display and narrow borders have become a trend of the liquid crystal display products.

Generally, a narrow border design of a display panel is mainly reflected in a narrower upper border, left border and right border, while the narrow border design for a lower border still cannot be realized. A main reason is that, as the resolution requirement for the display panel becomes increasingly higher, the quantity of output pins of a drive chip correspondingly increases, resulting in an increase in the quantity of corresponding traces. With the increase in the quantity of the traces, it is difficult to reduce a Fanout area used for arranging connection lines between a drive IC and a panel, thus the narrow border design for the lower border of the display panel cannot be realized like the upper border and the left and right borders, which seriously affects an appearance of the display panel.

SUMMARY

The following is a summary of the subject matter described in detail herein. This summary is not intended to limit the protection scope of the claims.

In one aspect, a display panel is provided in the present disclosure, including a touch display region and a border region, wherein multiple touch drive lines and multiple multi-path selection units are disposed within the touch display region, each of the multi-path selection units is electrically connected with at least part of the multiple touch drive lines, the border region includes a wiring region, and input signal lines of the multi-path selection units are arranged within the wiring region.

In some possible implementations, a quantity of the multiple touch drive lines is N, each of the multiple selection units is electrically connected with m touch drive lines, and a quantity of the input signal lines is N/m, wherein $1<m<N$, and m and N are both natural numbers.

In some possible implementations, $m=3$.
In some possible implementations, $N=648$.
In some possible implementations, the border region further includes a drive circuit located outside the wiring region, wherein the drive circuit includes multiple signal output units, the multiple signal output units are electrically connected with the multi-path selection units, one to one, through the input signal lines, and the signal output units time-divisionally drive the multiple touch drive lines electrically connected with the multi-path selection units through the multi-path selection units.

In some possible implementations, a selection signal line for controlling gated paths of the multi-path selection units is also disposed within the touch display region, and controlling ends of the multi-path selection units are all electrically connected with the selection signal line.

In some possible implementations, the selection signal line inputs a gating signal to the multi-path selection units to control the input signal lines to sequentially connect to the multiple touch drive lines.

In some possible implementations, the touch display region is provided with multiple contacts for external connection, and the input signal lines are electrically connected with the multi-path selection units through the contacts.

In some possible implementation modes, the drive circuit is a drive chip integrated with touch control and a display driver.

In another aspect, the present disclosure also provides a display device, including the display panel described above.

Other features and advantages of technical solutions of the present disclosure will be set forth in the description which follows, and in part will become apparent from the description, or be learned by practice of the technical solutions of the present disclosure. Purposes and other advantages of the technical solutions of the present disclosure may be realized and obtained by structures specifically pointed out in the specification, claims and drawings.

Other aspects will become apparent upon reading and understanding the drawings and detailed description.

BRIEF DESCRIPTION OF DRAWINGS

Accompanying drawings are used to provide a further understanding of technical solutions of the present disclosure, form a part of the specification, and explain technical solutions of the present disclosure together with embodiments of the present disclosure, while they do not constitute a limitation on the technical solutions of the present disclosure.

DETAILED DESCRIPTION

In order to make purposes, technical solutions and advantages of the present disclosure clearer, embodiments of the present disclosure will be described in detail below with reference to the accompanying drawings. Those skilled in the art should understand that embodiments in the present disclosure and features in the embodiments may be combined with each other arbitrarily if there is no conflict.

For an existing touch panel, in order to meet a requirement of touch performance, a drive chip (IC) of Touch and Display Driver Integration (TDDI) needs to output many drive signals to drive touch drive lines, i.e., Txs. Each drive signal in the drive IC corresponds to an Active Front End unit, i.e., an AFE unit. With increase of Txs, the quantity of the drive signals increases, and accordingly the quantity of the AFE units also increases, such that a large amount of IC area is occupied, thus increasing a core area and cost of the IC.

Figure 1:
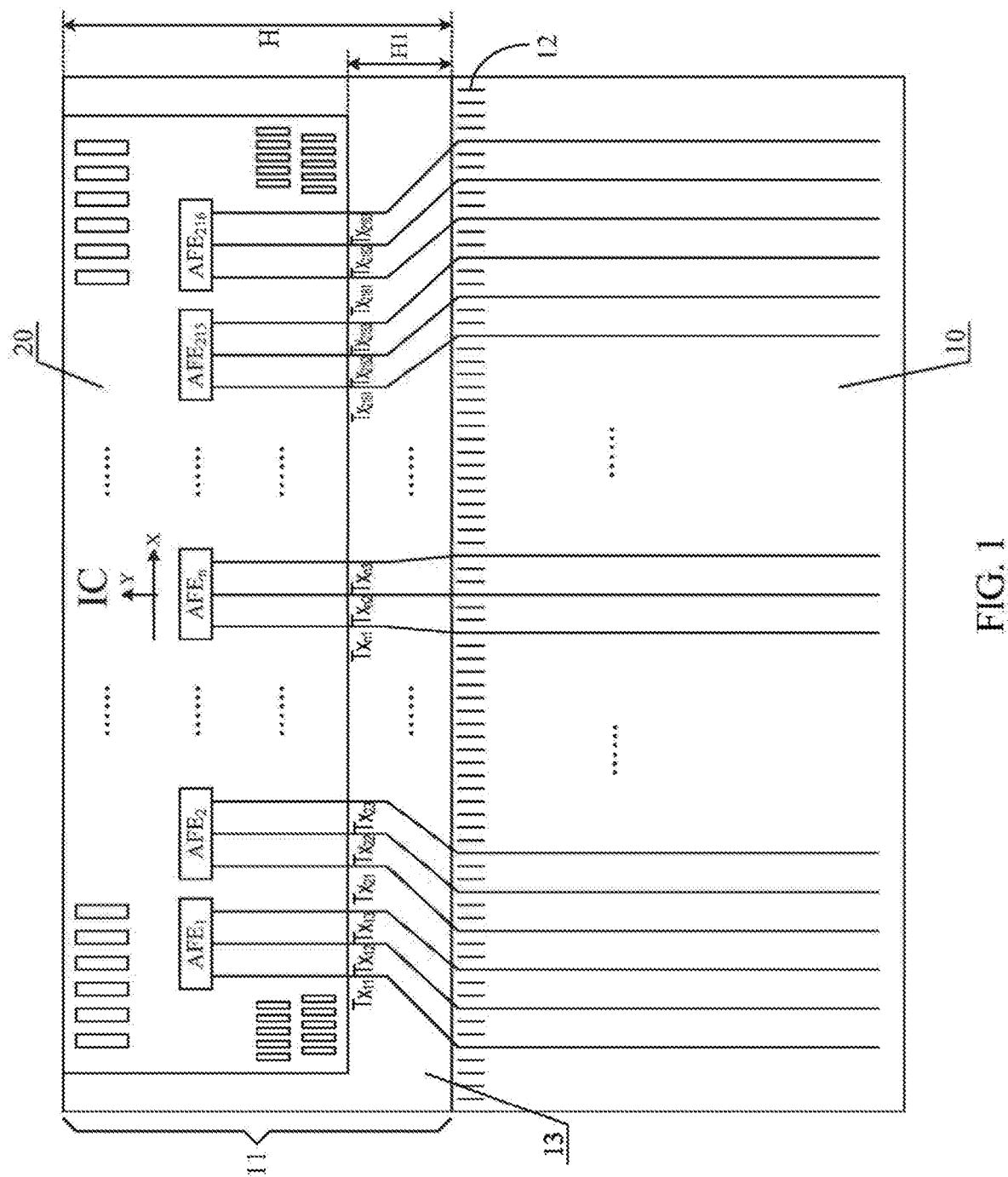
FIG. 1 is a schematic structural diagram of a display panel.

FIG. 1 is a schematic structural diagram of a display panel. The display panel includes a touch display region 10 and a border region 11. The touch display region 10 is provided with multiple touch drive lines Txs, and the touch display region 10 is provided with multiple contacts 12 for external connection. The border region 11 includes a drive circuit region 20 and a wiring region 13 (also referred to as a Fanout). The drive circuit region 20 is provided with a drive IC. The wiring region 13 is located between the drive circuit region 20 and the touch display region 10, and is used for arranging connection lines between the drive IC and the contacts 12. In FIG. 1, connection lines for the drive IC and Txs are disposed within the wiring region 13, a width of the wiring region 13 is H1, and a width of the border region 11 is H.

In order to reduce the quantity of AFE units to reduce an IC area, touch scanning may be performed in a time-divisional drive mode, i.e. one AFE unit is electrically connected with multiple touch drive lines Txs, and the AFE unit time-divisionally outputs drive signals to the multiple Txs connected therewith, as shown in FIG. 1.

In FIG. 1, one AFE unit is electrically connected with m Txs, wherein m=3. Assuming that rows and columns of touch blocks of a panel are X*Y, and one AFE unit is electrically connected with m Txs, the quantity N of AFEs is N=(X*Y)/m, wherein m>1, and N and m are natural numbers. In this way, for a given touch performance, the quantity of AFE units is reduced to 1/m of the quantity of Txs, thereby reducing the quantity of the AFE units, reducing the area of the IC and the cost of the IC. At present, a touch channel of a mainstream display panel may support up to 18*36, i.e. 648, touch blocks, then a drive IC needs to output drive signals to 648 touch drive lines Txs.

In FIG. 1, the touch display region 10 is provided with 648 touch drive lines Txs, each AFE unit corresponds to 3 Txs, and the quantity of AFE units is 216. In a specific implementation, each AFE unit may correspond to 3, 4, 5 or 9 different Txs, then at least 72 AFE units are included in an IC. The quantity of the AFE units is inversely proportional to the quantity of Txs corresponding to an AFE unit, and the area of an AFE unit is directly proportional to the quantity of Txs corresponding to the AFE unit. The manner that one AFE unit corresponds to multiple Txs may reduce an area of the driving IC and reduce a cost of the driving IC. However, since the AFE units are located within the driving IC, the driving IC still needs to be electrically connected with 648 Txs, and the quantity of traces between the driving IC and the touch display region 10 is not reduced. That is, 648 traces still need to be arranged within the wiring region 13, such that an area of the wiring region 13 cannot be reduced, and the width H1 of the wiring region 13 cannot be reduced, thus the width H of a border region cannot be effectively reduced. Generally, the border region is a lower border of the display panel, and thus a width of the lower border cannot be reduced effectively.

A display panel is provided in the present disclosure. In an exemplary embodiment, the display panel includes a touch display region and a border region, wherein multiple touch drive lines Txs and multiple multi-path selection units are disposed within the touch display region, each of the multi-path selection units is electrically connected with at least part of the multiple touch drive lines Txs, the border region includes a wiring region, and input signal lines of the multi-path selection units are arranged within the wiring region.

In the above display panel, the input signal lines of the multi-path selection units are arranged within the wiring region. Since each multi-path selection unit is electrically connected with multiple touch drive lines Txs, the quantity of the multi-path selection units, that is, the quantity of the input signal lines, is less than the quantity of the touch drive lines Txs. Compared with a solution in which signal lines of the same quantity as the touch drive lines Txs are arranged within the wiring region, the quantity of signal traces within the wiring region of the display panel is greatly reduced. In this way, an area of the wiring region may be reduced, thereby reducing a width of the wiring region and further reducing a width of the border region. Generally, the border region is a lower border, thus a narrow border design of the lower border is realized.

Hereinafter, technical contents of the present disclosure will be described in detail with reference to embodiments.

Figure 2:
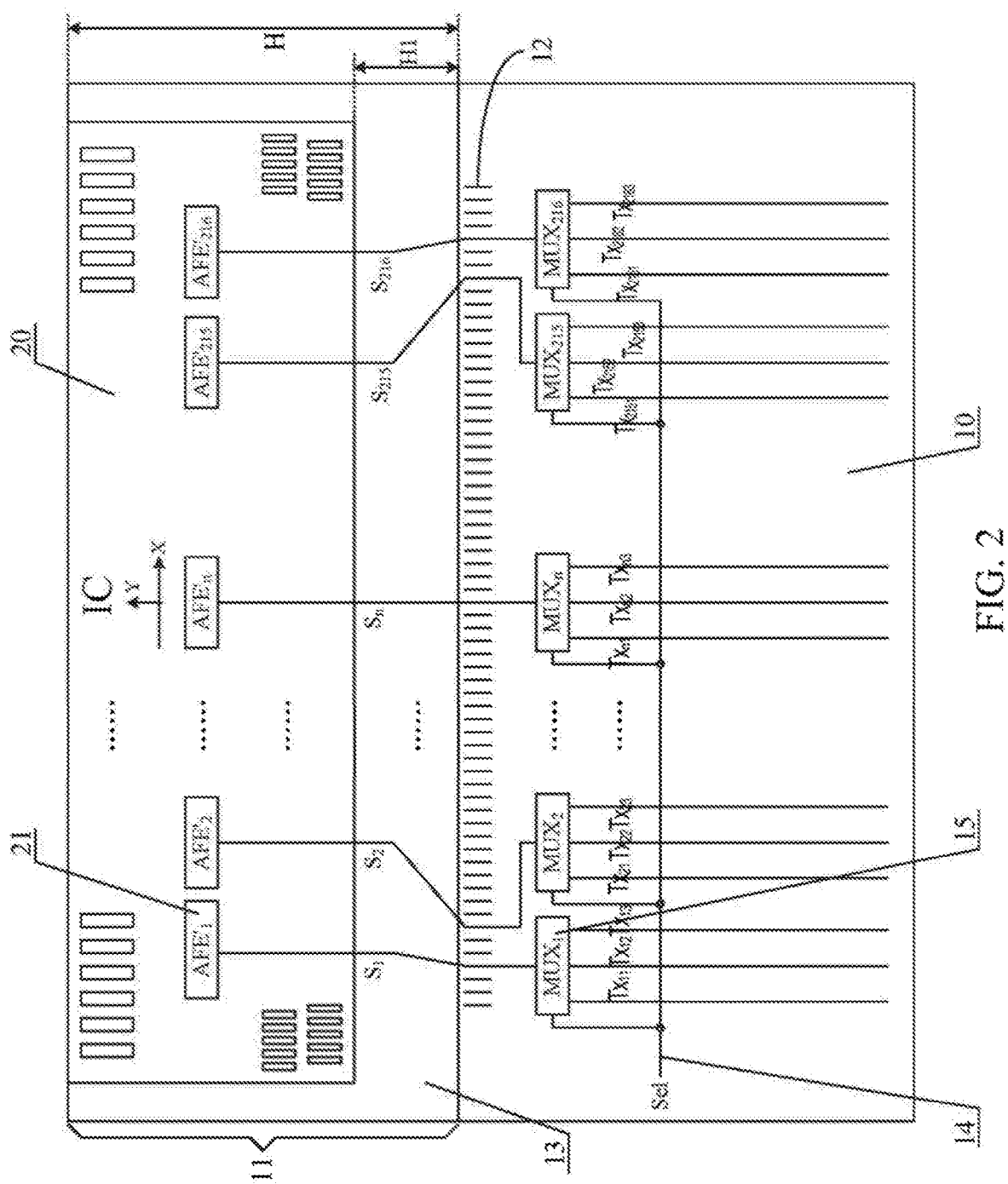
FIG. 2 is a schematic structural diagram of a display panel according to an embodiment of the present disclosure.

FIG. 2 is a schematic structural diagram of a display panel according to an embodiment of the present disclosure. As shown in FIG. 2, the display panel includes a touch display region 10 and a border region 11, wherein N touch drive lines Txs are provided in the touch display region 10. The border region 11 includes a drive circuit region 20 and a wiring region 13, wherein the drive circuit region 20 is located outside the wiring region 13. Multiple multi-path selection units (MUXs) 15 are disposed within the touch display region 10, wherein each multi-path selection unit 15 is electrically connected with m touch drive lines Txs, 1<m<N, and m is a natural number. A drive circuit is disposed within the drive circuit region 20, wherein the drive circuit includes multiple signal output units (AFE's) 21 for outputting drive signals. The drive circuit may be a TDDI drive chip. The multiple signal output units 21 and the multiple multi-path selection units 15 are electrically connected, one to one, through input signal lines (S). The input signal lines (S) are arranged within the wiring region 13. Since each multi-path selection unit 15 is electrically connected with m touch drive lines Txs, the quantity of the multi-path selection units (MUXs) 15 is N/m. Correspondingly, the quantity of the signal output units 21 is N/m and the quantity of the input signal lines (S) is N/m. That is, N/m connection lines between the drive circuit and the multi-path selection units are arranged within the wiring region 13.

In the display panel of the embodiment of the invention, N/m connection lines between the drive circuit and the multi-path selection units are arranged within the wiring region. Compared with N connection lines between the drive circuit and the touch display region arranged within the wiring region, the quantity of traces within the wiring region 13 is greatly reduced, so that an area of the wiring region 13 may be reduced, thereby reducing a width H1 of the wiring region 13, further reducing a width H of the border region, and display and touch effects will not be affected, realizing a narrow border design of a lower border. It is easy to understand that an area occupied by the MUX is very small and will not affect the touch display region 10.

As shown in FIG. 2, in the present embodiment, N=648, m=3, i.e., the quantity of touch drive lines Txs is 648, and each multi-path selection unit 15 is electrically connected with 3 Txs, then the quantity of multi-path selection units (MUX) 15 is 216. Correspondingly, the quantity of signal output units 21 is 216, and the signal output units 21 and the multi-path selection units 12 are electrically connected, one to one, through the signal connection lines 13, that is, the quantity of connection lines between the drive IC and the touch display region 10 is only 216, then the quantity of signal traces located within the wiring region 13 is only 216, as shown in FIG. 2. Compared with the quantity 648 of the signal traces within the wiring region 13 in FIG. 1, the quantity of the signal traces within the wiring region 13 in FIG. 2 is greatly reduced, so that the area of the wiring region 13 may be reduced, thereby reducing the width H1 of the wiring region 13, further reducing the width H of the border region, and display and touch effects will not be affected, realizing a narrow border design of a lower border.

As shown in FIG. 2, multiple contacts 12 for external connection are provided in the touch display region 10, and the input signal lines (S) are electrically connected with the multi-path selection units 15 through the contacts 12.

The drive circuit may time-divisionally output drive signals to N touch drive lines (Txs) through the multi-path selection units 15, that is, the signal output units 21 time-divisionally drive multiple touch drive lines electrically connected with the multi-path selection units 15 through the multi-path selection units 15.

In order to achieve the time-divisional drive of the touch drive lines Txs by the drive circuit through the multi-path selection units 15, in the present embodiment, as shown in FIG. 2, a selection signal line 14 for controlling gated paths of the multi-path selection units 15 is also disposed within the touch display region. Controlling ends of the multi-path selection units 15 are all electrically connected with the selection signal line 14. The selection signal line 14 inputs a gating signal (Sel signal) to the multi-path selection units 15 to decide the gated paths of the multi-path selection units 15, so as to control the input signal lines (S) to sequentially connect with the corresponding multiple touch drive lines Txs. Table 1 is a relationship between the Sel signal and the MUX gated paths.

TABLE 1

A relationship between Sel signals and MUX path gating

| Sel | Gated path |
| --- | --- |
| 000 | No |
| 001 | $Tx_{n3}$ |
| 010 | $Tx_{n2}$ |
| 011 | $Tx_{n2}$ and $Tx_{n3}$ |
| 100 | $Tx_{n1}$ |
| 101 | $Tx_{n1}$ and $Tx_{n3}$ |
| 110 | $Tx_{n1}$ and $Tx_{n2}$ |
| 111 | $Tx_{n1}$, $Tx_{n2}$ and $Tx_{n3}$ |

In the present embodiment, one multi-path selection unit 15 is electrically connected with three touch drive lines Txs, so one multi-path selection unit 15 has eight gating modes theoretically as follows, as shown in Table 1.

Assuming that the selection signal line 14 outputs a Sel signal to the n-th multi-path selection unit 15, i.e., MUXn, when the Sel signal is 000, there is no drive signal for multiple Txs connected with the MUXn. When the Sel signal is 001, the n-th signal output unit $AFE'_n$ outputs a drive signal to the $T_{n3}$ connected with the $MUX_n$. When the Sel signal is 010, the n-th signal output unit $AFE'_n$ outputs a drive signal to the $Tx_{n2}$ connected with the $MUX_n$. When the Sel signal is 011, the n-th signal output unit $AFE'_n$ outputs drive signals to the $Tx_{n2}$ and the $Tx_{n3}$ connected with the $MUX_n$. When the Sel signal is 100, the n-th signal output unit $AFE'_n$ outputs a drive signal to the $Tx_{n1}$ connected with the $MUX_n$. When the Sel signal is 101, the n-th signal output unit $AFE'_n$ outputs drive signals to the $Tx_{n1}$ and the $Tx_{n3}$ connected with the $MUX_n$. When the Sel signal is 110, the n-th signal output unit $AFE'_n$ outputs drive signals to the $Tx_{n1}$ and the $Tx_{n2}$ connected with the $MUX_n$. When the Sel signal is 111, the n-th signal output unit $AFE'_n$ outputs drive signals to the $Tx_{n1}$, the $Tx_{n2}$ and the $Tx_{n3}$ connected with the $MUX_n$.

In the present embodiment, the selection signal line 14 inputs a gating signal to the n-th multi-path selection unit 15 to control the n-th signal output unit 21 to connect with the touch drive lines $Tx_{n1}$, $Tx_{n2}$ and $Tx_{n3}$ sequentially through the input signal line (S), so that the n-th signal output unit $AFE'_n$ time-divisionally outputs drive signals to the $Tx_{n1}$, the $Tx_{n2}$ and the $Tx_{n3}$, therefore the Sel signals include 100, 010 and 001.

In FIG. 1, the AFE unit has a time-divisional drive function, so the AFE unit may be directly electrically connected with 3 Txs, and time-divisionally outputs drive signals to the 3 Txs connected therewith. In FIG. 2, the drive circuit controls the MUX by the Sel signal, so that the signal output unit 21 outputs a drive signal to only one of the 3 Txs connected with the MUX to achieve time-divisional drive of the Txs.

In the present embodiment, a drive scanning time is T, and the scanning time T is divided into N/m parts, that is, a total scanning time length of n touch driving lines corresponding to each MUX is mT/N. A driving scanning principle of the display panel (referring to FIG. 2) is as follows.

Within the first mT/N time, the selection signal line 14 inputs Sel signals 001, 010 and 100 to the $MUX_1$, and the $AFE'_1$ time-divisionally outputs drive signals to the $Tx_{11}$, the $Tx_{12}$ and the $Tx_{13}$.

Within the second mT/N time, the selection signal line 14 inputs Sel signals 001, 010, and 100 to the $MUX_2$, and the $AFE'_2$ time-divisionally outputs drive signals to the $Tx_{21}$, the $Tx_{22}$ and the $Tx_{23}$.

. . . .

Within the n-th mT/N time, the selection signal line 14 inputs Sel signals 001, 010 and 100 to the $MUX_n$, and the $AFE'_n$ time-divisionally outputs drive signals to the $Tx_{n1}$, the $Tx_{n2}$ and the $Tx_{n3}$.

. . . .

Within the 215th mT/N time, the selection signal line 14 inputs Sel signals 001, 010 and 100 to the $MUX_{215}$, and the $AFE'_{215}$ time-divisionally outputs drive signals to the $Tx_{2151}$, the $Tx_{2152}$ and the $Tx_{2153}$.

Within the 216th mT/N time, the selection signal line 14 inputs Sel signals 001, 010 and 100 to the $MUX_{216}$, and the $AFE'_{216}$ time-divisionally outputs drive signals to the $Tx_{2161}$, the $Tx_{2162}$ and the $Tx_{2163}$.

In this way, when the scanning time T ends, one cycle of Tx drive scanning is completed.

Figures 1, 3:
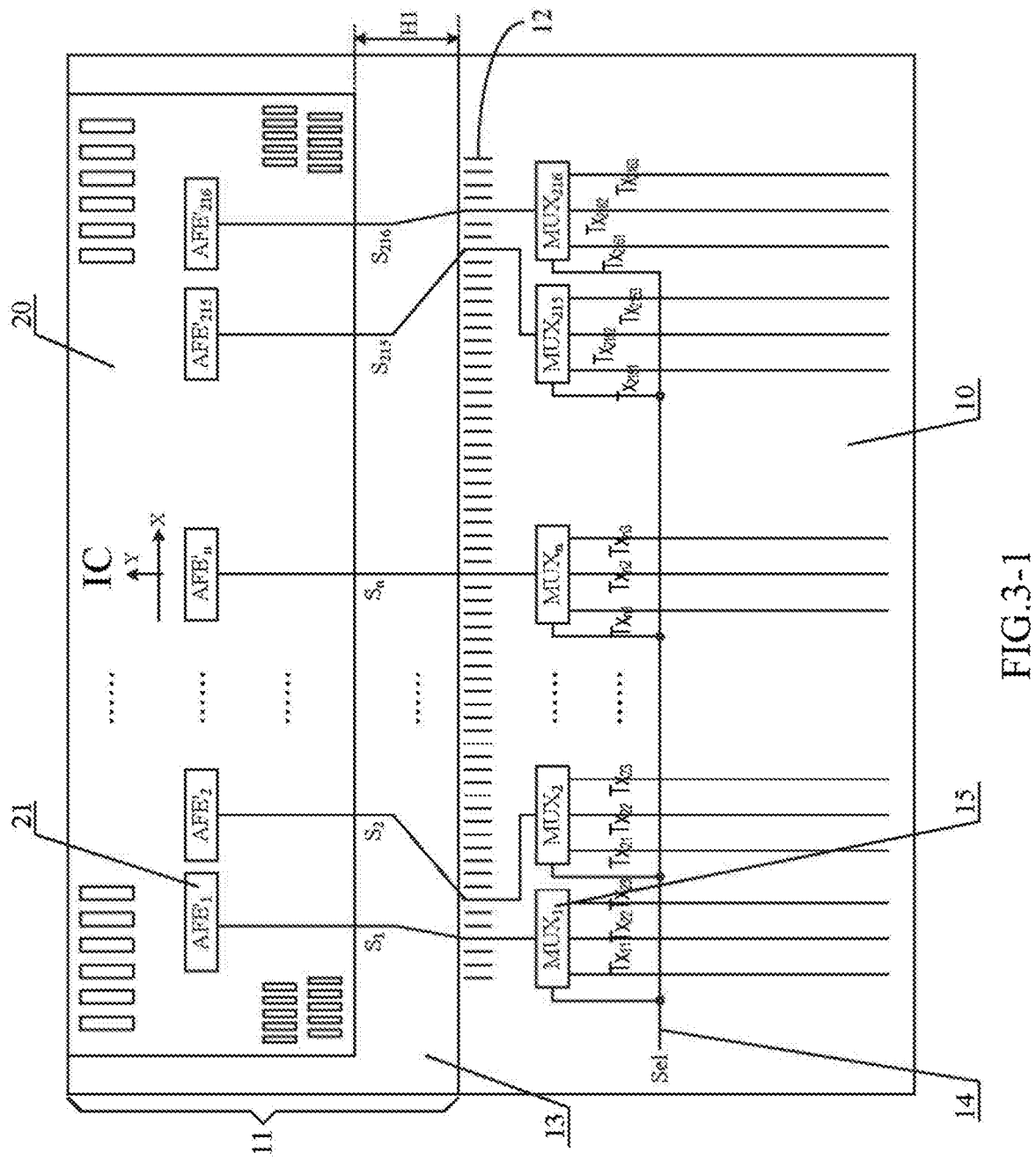
FIG. 3 is a schematic diagram of comparison before and after a lower border of a panel is narrowed by applying a technical solution of the present disclosure.
Figures 2, 3:
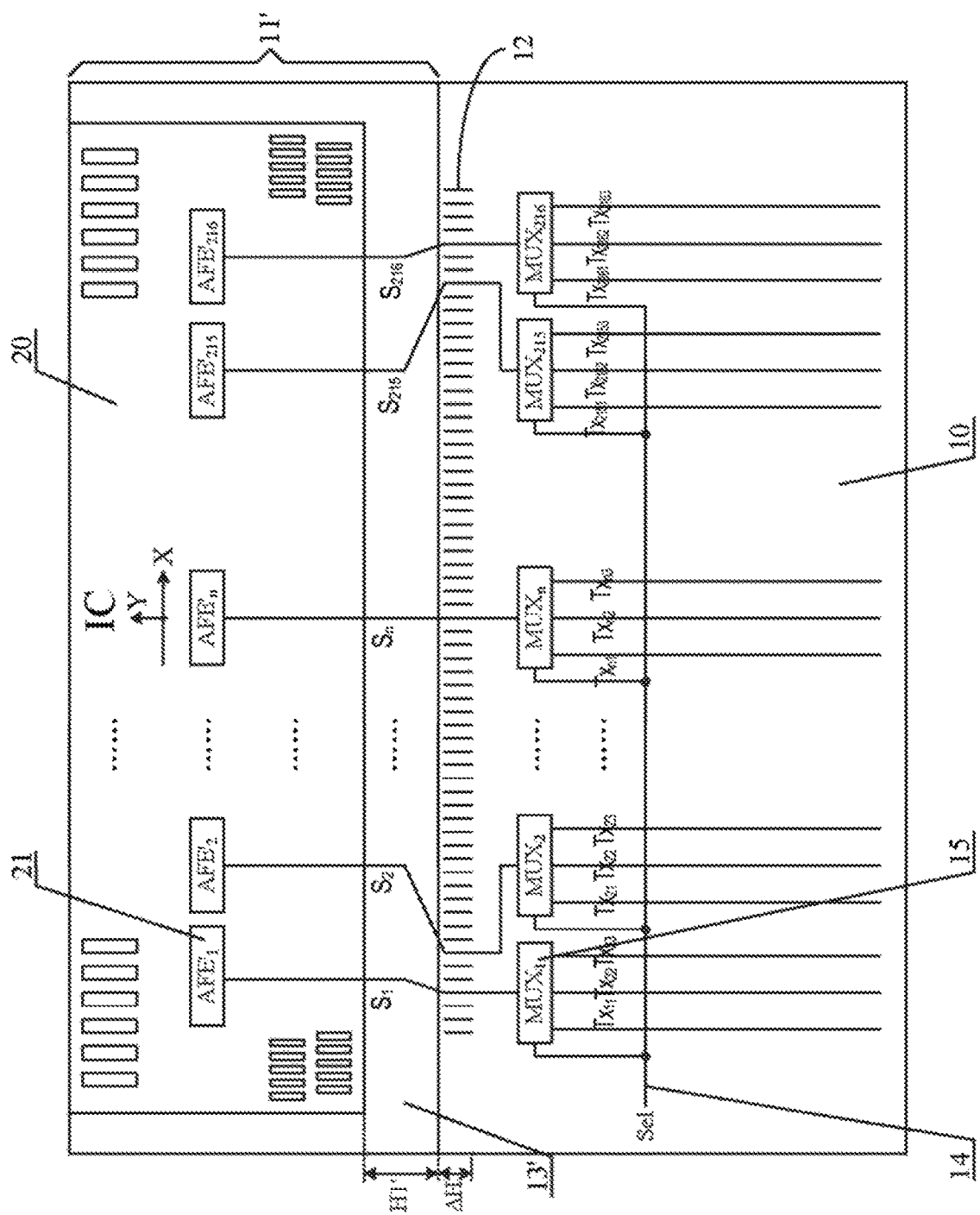

FIG. 3 is a schematic diagram of comparison before and after a lower border of a panel is narrowed by applying a technical solution of the present disclosure. In the left diagram in FIG. 3, since the quantity of signal traces within the wiring region 13 is reduced from 648 to 216, i.e., the quantity of signal traces within the wiring region 13 is reduced to ⅓ of the original quantity. In a case that a panel size and a Bump pitch between the contacts 12 are not changed, a trace area within the wiring region 13 is reduced, therefore there is a space for reducing the width of the wiring region. For example, the width of the wiring region 13 may be reduced to H1', wherein the H1' is reduced by ΔH compared with the H1, effectively reducing the width of the wiring region 13, further a width of the lower border may be reduced, realizing a narrow border design of the lower border. It is found by the inventor's research that, the ΔH is about ⅕~⅐ of the H, i.e. the width reduction amount of the lower border is about ⅕~⅐ of the original one.

In the present disclosure, a display device is further provided, including the display panel of the previous embodiment. The display device may be any product or component with a display function such as a mobile phone, a tablet computer, a television, a display, a notebook computer, a digital photo frame, a navigator, etc.

In the description of the present disclosure, it need be understood that an orientation or a position relationship indicated by terms "inside", "outside", etc. is based on an orientation or a location relationship shown in the drawings, and this is only for convenience of description of the present disclosure and simplification of description, but does not indicate or imply that the referred device or element must have a specific orientation, be constructed and operated in a specific orientation, and therefore this cannot be understood as a limitation on the present disclosure.

In the description of the present disclosure, it should be noted that unless otherwise explicitly specified and defined, a term "connect" should be understood broadly, for example, it may be an electrical connection; it may be directly connected, or it may be indirectly connected through an intermediate medium, or it may be an internal connection of two elements. For those of ordinary skill in the art, the specific meaning of the above terms in the present disclosure may be understood according to a specific situation.

Although the embodiments disclosed in the present disclosure are as the above, the contents are only embodiments for facilitating understanding the present disclosure and are not used to limit the present disclosure. Any person skilled in the field to which the present disclosure pertains can make any modifications and variations in the forms and details of implementation without departing from the spirit and the scope disclosed in the present disclosure, but the patent protection scope of the present disclosure should still be subject to the scope defined by the appended claims.

What we claim is:

1. A display panel, comprising: a touch display region and a border region, the border region being located at at least one side of the touch display region, a plurality of touch drive lines and a plurality of multi-path selection units being disposed within the touch display region, at least one of the multi-path selection units being electrically connected with at least part of the plurality of touch drive lines, the border region comprising a wiring region, and input signal lines of the multi-path selection units being arranged within the wiring region, wherein the border region further comprises a drive circuit located outside the wiring region, the drive circuit comprises a plurality of signal output units, the plurality of signal output units are electrically connected with the multi-path selection units, one to one, through the input signal lines, and the signal output units time-divisionally drive the plurality of touch drive lines electrically connected with the multi-path selection units through the multi-path selection units, wherein a quantity of the plurality of touch drive lines is N, each of the plurality of selection units is electrically connected with m touch drive lines, and a quantity of the input signal lines is N/m, wherein 1<m<N, and m and N are both natural numbers;

wherein a selection signal line for controlling gated paths of the multi-path selection units is disposed within the touch display region, and controlling ends of the multi-path selection units are all electrically connected with the selection signal line;

wherein the selection signal line inputs a gating signal to the multi-path selection units to control the input signal lines to sequentially connect to the plurality of touch drive lines;

wherein the multi-path selection units comprises a first multi-path selection unit ($MUX_1$) to a 216-th multi-path selection unit ($MUX_{216}$), the signal output units comprises a first signal output unit to a 216-th signal output unit;

wherein a scanning time of the drive circuit is T, and the scanning time T is divided into N/m parts, a total scanning time length of n touch drive lines corresponding to each multi-path selection unit is mT/N, wherein the n is a natural number, within a first mT/N time, the selection signal line inputs gating signals 001, 010 and 100 to the $MUX_1$, and the first signal output unit time-divisionally outputs drive signals to touch drive lines $Tx_{11}$ $Tx_{12}$ and $Tx_{13}$, within a second mT/N time, the selection signal line inputs gating signals 001, 010, and 100 to the $MUX_2$, and the second signal output unit time-divisionally outputs drive signals to touch drive lines $Tx_{21}$ $Tx_{22}$ and $Tx_{23}$,

. . . .

within a n-th mT/N time, the selection signal line inputs gating signals 001, 010 and 100 to the $MUX_n$, and the n-th signal output unit time-divisionally outputs drive signals to touch drive lines $Tx_{n1}$ $Tx_{n2}$ and $Tx_{n3}$,

. . . .

within a 215th mT/N time, the selection signal line inputs gating signals 001, 010 and 100 to the $MUX_{215}$, and the 215-th signal output unit time-divisionally outputs drive signals to touch drive lines $Tx_{2151}$ $Tx_{2152}$ and $Tx_{2153}$ and within a 216th mT/N time, the selection signal line inputs gating signals 001, 010 and 100 to the $MUX_{216}$, and the 216-th signal output unit time-divisionally outputs drive signals to touch drive lines $TX_{2161}$ $TX_{2162}$ and $TX_{2163}$, wherein in a case the scanning time T ends, one cycle of drive scanning for the touch drive lines is completed.

2. The display panel according to claim 1, wherein the touch display region is provided with a plurality of contacts for external connection, and the input signal lines are electrically connected with the multi-path selection units through the contacts.

3. The display panel according to claim 2, further comprising a selection signal line for controlling gated paths of the multi-path selection units, the selection signal line being also disposed within the touch display region, and controlling ends of the multi-path selection units being all electrically connected with the selection signal line.

4. The display panel according to claim 3, wherein the selection signal line inputs a gating signal to the multi-path selection units to control the input signal lines to sequentially connect to the plurality of touch drive lines.

5. The display panel according to claim 3, wherein the drive circuit is a drive chip of touch and display driver integration.

6. The display panel according to claim 1, wherein the drive circuit is a drive chip of touch and display driver integration.

7. The display panel according to claim 6, further comprising a selection signal line for controlling gated paths of the multi-path selection units, the selection signal line being also disposed within the touch display region, and controlling ends of the multi-path selection units being all electrically connected with the selection signal line.

8. The display panel according to claim 7, wherein the selection signal line inputs a gating signal to the multi-path selection units to control the input signal lines to sequentially connect to the plurality of touch drive lines.

9. A display device, comprising the display panel according to claim 1.

10. The display panel according to claim 1, wherein m=3.

11. The display panel according to claim 1, wherein N=648.

* * * * *